United States Patent Office 3,288,552
Patented Nov. 29, 1966

3,288,552
ICE COLOR COMPOSITION
Clemens Streck, Loudonville, N.Y., assignor to General Aniline & Film Corporation, New York, N.Y., a corporation of Delaware
No Drawing. Filed Dec. 31, 1963, Ser. No. 334,897
11 Claims. (Cl. 8—44)

This invention relates to the production of ice color compositions and more particularly to the provision of stable, dry particulate compositions suitable for producing ice colors on the fiber.

In the azoic or ice color dyeing and printing of fibrous materials such as textile fibers, leather and the like, a diazotizable aromatic or heterocyclic primary amine, usually called the azoic diazo base, devoid of water-solubilizing groups such as carboxylic and sulfonic acid groups, is diazotized and coupled on the fiber with an azoic coupling component, also devoid of solubilizing groups. The diazo may be in the form of a freshly prepared diazo or as a pre-stabilized diazo. In some cases wherein the diazonium salt is relatively stable, it may be as the sulfate or chloride, but more often it is stabilized as a double salt with a compound such as zinc chloride, or as a diazoamino compound with a stabilizing amine.

The stabilizing amines are primary, or more preferably, secondary amines; they may be alkyl, aryl or heterocyclic; they contain solubilizing groups which solubilize the diazoamino compound, such as sulfonic, carboxylic, polyoxy and the like groups, and at least one replaceable hydrogen atom attached to an amino nitrogen atom.

One usual method of producing fabrics colored with azoic dyes is to print the material with an alkaline paste which contains both the diazoamino compound and the coupler and then develop the color in situ by treatment with a weak acid, in some few cases with steam, but preferably with acidified steam. A representative composition which comprises a diazoamino compound and an azoic coupler is available on the market under the trademark "Rapidogen" (General Aniline & Film Corporation), and such term, as used herein, is used in reference to this type of composition.

For the most part, Rapidogens have been produced and sold in powder or dry particulate form, but such compositions have often been found to be unsuitable on storage, insufficiently soluble after decomposition has set in, and productive of dull, weak shades after development on the fiber. Further, such compositions often have a tendency to agglomerate and/or to dust in handling.

It is an object of this invention to provide an ice color composition in dry particulate form which will not be subject to one or more of the above disadvantages. Another object of this invention is the provision of such a composition which is stable in storage, non-dusting, free-flowing, and/or productive of brighter and stronger shades of color. Other objects and advantages will appear as the description proceeds.

The attainment of the above objects is made possible by the present invention which includes the provision of a dry particulate composition comprising an ice color diazo compound solubilized and stabilized against azoic coupling on the alkaline side by reaction with an organic amine containing at least one solubilizing group and at least one replaceable hydrogen atom attached to an amino nitrogen atom, an ice color coupling component, and based on the weight of said solubilized and stabilized diazo compound, about 3 to 30% of a member of the group consisting of alkali metal orthoborates and tetraborates, and about 30 to 180% of sodium xylene sulfonate. The above defined compositions have been unexpectedly found to be stable on storage, non-dusting, free-flowing and yielding brighter and stronger color shades when applied to the fiber in known manner in the form of an aqueous dye bath or printing paste.

The ice color diazo components operative in the compositions of the instant invention are well known in the art and in general include diazotizable primary amine compounds devoid of solubilizing groups such as carboxylic or sulfonic acid groups. Included among such compounds are such aromatic and heterocyclic amines as anilines, xenylamines, naphthylamines, benzidines, aminocarbazoles, aminofuranes, aminothiazoles, aminoarylsulfones, aminodiphenyl ethers, aminobenzophenones, aminofluorenones, aminoazo compounds, and the like. As specific examples of some suitable ice color diazo components, there may be mentioned aminoazo toluene, 4-chloro-2-nitroaniline, 5-chloro-o-toluidine, 4-toluene, 4-nitro-o-toluidine, 2,5-dichloroaniline, 4-amino-m-anisidine, 4-nitro-o-anisidine, 4-chloro-o-anisidine, 1-aminonaphthalene, 1-aminoanthraquinone, dianisidine, 5-chloro-4-nitro-o-anisidine, aminobenzophenone, aminodiphenylsulfone, 2,6-dichloro-1,4-phenylenediamine, benzidine, 4,4'-diaminostilbene, and the like.

The present invention is particularly advantageous when using as ice color diazo components those of the aminodiphenylamine type. These diazotizable aromatic primary amine compounds are used extensively as bases for the production of azoic dyes. These aminodiphenylamines are for commercial purposes diazotized, sold and used as Fast Color Salts. They have the advantage over most Fast Color Salts in that their diazonium salts are sufficiently stable per se to the extent that there is no need to further stabilize them by formation of double salts such as with zinc chloride, tin chloride and the like, as is the case with the great majority of Fast Color Salts. However, in attempting to formulate a dry particulate composition containing a diazotized aminodiphenylamine stabilized with an organic amine as defined above, an ice color coupling component and the caustic soda, wherein the dyer or printer need only dissolve the composition in water (and thicken to use as a printing paste), these compositions were found to be particularly prone to instability and decomposition in storage, poor solubility after such decomposition, and dull, weak shades after development on the fiber. These disadvantages however are minimized or eliminated by employing the teachings of the present invention involving the addition to such compositions of a alkali metal orthoborate or tetraborate and, sodium xylene sulfonate as defined above.

As illustrative of such aminodiphenylamine compounds particularly suitable for use in making the solubilized, stabilized diazo component in the present compositions, there may be mentioned 4-aminodiphenylamine,
4-amino-3-methoxydiphenylamine,
4-amino-4'-methoxydiphenylamine,
4-amino-5-chloro-2-methoxydiphenylamine,
3-amino-6-methoxydiphenylamine,
4-amino-4'-ethoxydiphenylamine,
4-amino-3',4-dinitrodiphenylamine,
4-amino-4'-bromodiphenylamine, and
4-amino-4'-methyldiphenylamine.

Prior to incorporation in the compositions of the present invention, the ice color diazo component is diazotized in known manner as by treatment with sodium nitrite and dilute hydrochloric acid, and the resulting ice color diazo compound solubilized and stabilized against azoic coupling on the alkaline side in known manner by reaction with an organic amine containing at least one solubilizing group and at least one replaceable hydrogen atom attached to an amino nitrogen atom. The resulting stabilized ice color diazo compounds are often referred to as diazoamino, diazoimino, and diazoamidine compounds and the like, and generically under the term diazoamino compounds. The organic amines employed for such stabilization are well known and are reacted with the ice color diazo compound in proportions sufficient to react with all the diazo groups therein. As representative of such stabilizing organic amines, there may be mentioned by way of example, N-methyl taurine, sarcosine, 4-sulfo-2-aminobenzoic acid, 5-sulfo-2-methylaminobenzoic acid, 5-sulfo-2-ethylaminobenzoic acid, 1-aminobenzoic-3,6-disulfonic acid, alpha-naphthylamine-2,4-disulfonic acid, beta-naphthylamine, 4,6,8-trisulfonic acid, proline, pyrrolidine-alpha-sulfonic acid, glucamine, methyl glucamine, guanyl urea-N-sulfonic acid, guanyl taurine, N-nitro-guanyl urea, 2-biguanidyl naphthalene-1-sulfonic acid, creatine, cyanamide, and the like. Carboxylic and sulfonic acid groups are preferred as the solubilizing groups, but other groups are known such as ammonium salt groups and polyalcohol and cyano radicals and the like.

In general, the stabilized ice color diazo compounds employed in compositions of the instant invention are formed by the reaction of the diazo derivative of a strongly basic diazotizable primary amine with a stabilizing amine of weak basicity. Such stabilized compounds do not undergo a coupling reaction in alkaline media in the presence of an ice color coupling component, but in the presence of acidic reagents, they split, permitting coupling of the ice color diazo compound with the ice color coupling component.

The ice color coupling components operative in the instant invention, also well known in the art, are devoid of solubilizing groups such as carboxylic or sulfonic acid groups. In general, these coupling components may be characterized as compounds having an active methylene group, an enolizable keto group or an aromatic hydroxy group inducing coupling, usually in ortho- or para-position, preferably the former, to said hydroxy group. Such compounds are typified by the acylacetarylides (e.g. anilides, etc.), the pyrazolones, and aromatic hydroxy compounds capable of coupling. As acylacetarylides there may be mentioned acetoacetic acid arylides, furoyl acetic acid arylides, terephthaloyl-bis-acetic acid arylides, and the like. As pyrazolones, there may be mentioned 1-phenyl-3-methyl-5-pyrazolone,
1-p-tolyl-3-methyl-5-pyrazolone,
3-methyl-5-pyrazolone,
5-pyrazolone,
1,3-dimethyl-5-pyrazolone,
1-(p-chlorophenyl)-3-methyl-5-pyrazolone,
1-(p-nitrophenyl)-3-methyl-5-pyrazolone,
1-(o-methoxyphenyl)-3-methyl-5-pyrazolone,
1-(m-aminophenyl)-5-pyrazolone,
1-phenyl-5-pyrazolone-3-carboxylic acid methyl ester,
1-phenyl-5-pyrazolone-3-carboxylic acid ethyl ester, and other 5-pyrazolones either unsubstituted or substituted in the 1- and/or 3-positions by non-solubilizing radicals. The aromatic (carbocyclic or heterocyclic) hydroxy compounds useful as coupling components herein generally include phenol, resorcinol, 1- and 2-naphthol, benzonaphthols, hydroxybenzofluorenones, hydroxy-azo compounds such as (o-hydroxy-aniline→resorcinol) coppered and aniline→8-amino-2-naphthol and the like, in addition to arylides of beta-hydroxyaromatic and heterocyclic carboxylic acids. Illustratively, examples of such arylides (e.g. anilides, etc.) which may be employed in the process of the instant invention are 3-hydroxy-2-naphthoic acid arylides, 3-hydroxy-2-anthroic acid arylides, 3-hydroxy-2-carbazole carboxylic acid arylides, 3-hydroxy-2-furane carboxylic acid arylides, 2-hydroxy-11H-benzo(a)carbazole-3-carboxylic acid arylides, hydroxydibenzothiophene carboxylic acid arylides and the like. These and other such ice color coupling components operative herein are disclosed in Diserens, "Chemical Technology of Dyeing and Printing," volume 1, pages 213 to 224 (Reinhold Publishing Corp., 1948), Lubs, "Chemistry of Synthetic Dyes and Pigments," pages 182 through 192 (Reinhold Publishing Corp., 1955), and Adams, "Journal of the Society of Dyers and Colorists," volume 67 (1951), beginning at page 223.

Additional illustrative examples of specific coupling components operative herein include 3-hydroxy-2-naphthanilide,
3-hydroxy-2',5'-dimethoxynaphthanilide,
3-hydroxy-4'-nitronaphthanilide,
3-hydroxy-3'-chloronaphth-o-toluidide,
3-hydroxy-N-(1-naphthyl)-2-naphthanilide,
3-hydroxy-3'-cyano-2-naphthanilide,
2-hydroxy-2',5'-dimethoxy-3-dibenzofurancarboxanilide,
2-hydroxy-4'-chloro-3-carbazolecarboxanilide,
3-hydroxy-2-anthroic acid-o-toluidide,
2-hydroxy-4'-hydroxy-11-benzo[a]carbazole-3-carbox-o-toluidide,
bis(acetoacet)benzidide,
bis(acetoacet)-o-toluidide,
4'-chloro-2',5'-dimethoxyacetoacetanilide,
terephthaloylbis(3'-chloro-2',4'-dimethoxyanilide), and azo compounds as described in U.S. 2,135,433 and the non-metallized compounds thereof, e.g. 4-(5-chloro-2-hydroxybenzeneazo)resorcinol and its coppered complex.

As is well understood in the art, the compositions of this invention should contain approximately equivalent proportions of the stabilized ice color diazo component and ice color coupling component whereby little or no unreacted components remain after coupling has taken place on the fiber. Thus, a tetrazotized diazo component will require double the usual amount of coupler. Similarly, the compositions may contain a plurality of either or both the diazo component and the coupling component, the only requirement being the use of total equivalent proportions of each component. In similar known manner, the compositions may contain any desired proportions of combined diazo component and coupling component ranging for example from about 10% to 90% or more by weight.

As aforementioned, a critical feature of the present invention is the inclusion in the present compositions of amounts within the defined ranges of sodium or potassium orthoborate or tetraborate, and of sodium xylene sulfonate. This combination of additives has been found to be unexpectedly operative in minimizing or eliminating the disadvantageous properties of previously employed compositions.

In formulating the present compositions, it has also been found desirable in most cases for achieving optimum results to include a cationic surface active agent, generally in amounts ranging from about 0.5 to 12% based on the weight of the stabilized diazo component. Such surface active agents are well konwn in the art, being generally water soluble quaternary ammonium compounds containing at least one high molecular weight radical of at least 8 carbon atoms bonded to the nitrogen atom, and an anion. They may accordingly be represented by the formula

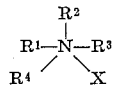

wherein $R^1$ is a high molecular weight radical of at least 8 carbon atoms; $R^2$, $R^3$ and $R^4$ are organic radicals; and X is an anion. In this formula, the high molecular weight radical $R^1$ may be saturated or unsaturated and may contain or be interrupted by hetero atoms such as oxygen, sulfur, and nitrogen, aromatic and cycloaliphatic groups, and the like. $R^2$, $R^3$ and $R^4$ are preferably lower molecular weight radicals, although one of them may also be a high molecular weight radical. X in the formula may be hydroxyl, chloride, bromide, iodide, mono-, di- or tribasic phosphate, acetate, formate, lactate, gluconate, sulfate, nitrite, nitrate, cyanide, borate, alkyl sulfate, alkyl or aryl sulfonate, benzoate or the like. As stated above, these compounds are well known and may be produced in known manner, for example by quaternizing a tertiary amine of the formula $NR^1R^2R^3$ by reaction with a compound having the formula $R^4X$. Cationic surface active quaternary ammonium compounds operative in the compositions of the instant invention, and their methods of production are disclosed in the prior art, including U.S. Patents 1,883,042, 2,060,850, 2,086,585, 2,087,121, 2,087,132, 2,108,765, 2,127,476, 2,129,264, 2,137,314, 2,214,353, 2,309,592 and 2,374,213.

The preferred quaternary ammonium compounds for use in the compositions of the instant invention are those wherein $R^1$ is a long chain hydrocarbon radical of from 8 to 18 carbon atoms, as derived for example from cocoanut, palm, soyabean, or castor oil, tallow or the like; $R^2$ and $R^3$ are lower alkyl such as methyl or ethyl, lower alkylol such as ethanol, or polyoxyalkylene alkanol containing up to 5 oxyalkylene, such as oxyethylene, groups and the like; $R^4$ is benzyl or lower alkyl such as methyl or ethyl; and X is chloride. The following quaternary ammonium compounds which may be employed in the instant invention are given for illustrative purposes only: dimethyl - decyl-benzyl-ammonium chloride, diethyl-dodecyl-benzyl-ammonium bromide, trimethyl-dodecyl-ammonium chloride, allyl-dibutyl-dodecyl-ammonium bromide, methyl-diallyl-dodecyl-ammonium iodide, triethyl-dodecyloxymethyl - ammonium chloride, dibenzyl-hydroxyethyl - dodecyloxymethyl-ammonium chloride, diethyl - benzylthioethyl-dodecyl-ammonium chloride, diethyl - benzyl-dodecylthioethyl-ammonium chloride, dibutyl - allyl-dodecyloxymethyl-ammonium chloride, diethyl-cyclohexyl-dodecyloxymethyl-ammonium chloride, trihydroxyethyl-dodecyl-ammonium chloride, dimethyl tetradecyl - benzyl-ammonium chloride, diethyl-pentadecyl-benzyl-ammonium bromide, oleyl-dietetraethyleneoxyethanol - benzyl-ammonium chloride, oleyl-ditetraethylenoxyethanolmethyl ammonium sulfate, stearyl-hydroxyethyl-ethoxyethanol-benzyl-ammonium chloride, stearyldihydroxyethyl-benzyl-ammonium chloride, and the like.

It has also been found desirable in most cases to include in these compositions water soluble anionic surface active agents in amounts approximately equal to and up to or 3 times the amount of the above described cationic surface active agents. These anionic surface active agents are likewise well known in the art and are in general organic sulfates and sulfonates containing at least 9 carbon atoms. Included in this group are the alkyl arylsulfonates such as dodecylbenzene sulfonate, isopropylnaphthalene sulfonate, diisobutylnapthalene sulfonate, and the like, N-higher acyl taurines such as N-oleoyl-N-methyl taurine, N-tallow acyl-N-methyl taurine, N-tall oil acyl N-ethyl taurine, N-palmitoyl-N-methyl taurine, and the like, higher aliphatic sulfates and sulfonates such as lauryl sulfate. Oxo tridecyl sulfate, sulfonated and sulfated castor oil, and the like, higher fatty acid esters of isethionic acid and the like and sulfonated polycarboxylic acid esters such as diamyl sulfosuccinate, dioctylsulfosuccinate, and formaldehyde naphthalene sulfonates, such as sodium formaldehyde naphthalene sulfonate which is available on the market as "Tamol NNO" and the like. All of these sulfates and sulfonates are preferably employed in the form of their alkali metal salts with sodium or potassium, although other salts may be employed such as those with alkaline earth metals such as magnesium, ammonia or amines such as methylamine, ethanolamine, cyclohexylamine, morpholine, piperidine, and the like.

In accordance with known principles, the compositions of this invention should yield an alkaline solution, and preferably a solution having a pH of from about 9 to 13, in the presence of water to prevent premature coupling. This is ordinarily accomplished by including in the compositions a sufficient amount of an alkalizing agent to result in such an alkaline solution. Caustic soda or caustic potash are preferred for this purpose, in dry form, although other alkaline-reactive substances may be employed such as the sodium and potassium carbonates, phosphates and the like. The addition of caustic soda or potash is particularly preferred when using an aminodiphenylamine as the diazo component. It will be understood that in this type of component, either or both of the phenyl nuclei may be substituted by 1 or 2 inert or auxochromic groups such as chlorine, lower alkyl such as methyl and ethyl, lower alkoxy such as methoxy and ethoxy, nitro, cyano and the like.

These compositions may also contain other usual additives including wetting agents, urea, sodium chromate, etc. The compositions may be prepared in any desired manner and the components mixed in any desired order provided only that a dry particulate composition is produced.

The following examples are only illustrative of this invention and are not to be regarded as limitative. All parts and proportions referred to herein and in the appended claims are by weight unless otherwise indicated. All the compositions in the following examples are non-dusting, free-flowing and stable in storage, and yield dyeings and prints which are in general brighter and stronger than dyeings and prints made with compositions devoid of the combination of alkali metal borate and xylene sulfonate additives required in accordance with the present invention.

In the following examples:

(D+S) means diazotized and stabilized with sarcosine,

Nekal BX is sodium butylnaphthalene sulfonate, General Aniline and Film Corporation, Agent A is a mixture of cationic long chain alkyl dimethyl benzyl ammonium chlorides in which the alkyl groups contain from 8 to 18 carbon atoms with an average 12 to 14 carbon atom content as derived from cocoanut oil, Naphthol AS is 3-hydroxy-2-naphthanilide, Naphthol AS–BS is 3'-nitro-3-hydeoxy-2-naphthanilide, Naphthol AS–G is 4,4'-bis-o-acetoacetotoluidide, Naphthol AS–GR is 3-hydroxy-2-anthroic-o-toluidide, Naphthol AS–PH is 3-hydroxy-2-naphth-o-phenetidide, Diazo 23 is 6-chloro-$\alpha,\alpha,\alpha$-trifluoro-m-toluidine diazo stabilized with N-ethylisoanthranilic acid, zinc chloride-pyridine complex, Diazo 24 is dianisidine tetrazo stabilized with methyltaurine, Diazo 25 is 4-carbamyl-o-anisidine diazo stabilized with cyanamide.

*Example 1*

The following ingredients are dry-mixed:

| | Parts |
|---|---|
| 4-amino-4'-methoxydiphenylamine (D+S) | 37.0 |
| Naphthol AS | 19.0 |
| Borax | 3.5 |
| Caustic soda flake | 17.0 |
| Sodium xylene sulfonate | 21.0 |
| Nekal BX | 1.5 |
| Agent A | 1.0 |

4 parts of the above mixture is dissolved in 4 parts of alcohol and 22 parts of warm water. The solution is thickened to printing consistency with starch-tragacanth (about 70 parts). It is printed onto cotton muslin, dried, passed through acidified steam, rinsed, soaped and dried. An excellent blue coloration is obtained of excellent color value. Instead of using acidified steam, the print may be developed in neutral steam or in dry heat at 300° F. for 3–10 minutes.

*Example 2*

The following ingredients for a green print are dry-mixed:

| | Parts |
|---|---|
| 4-amino-4'-methoxydiphenylamine (D+S) | 15.0 |
| Naphthol AS–GR | 60.0 |
| Borax | 4.0 |
| Caustic soda flake | 22.0 |

Example 2—Continued

Sodium xylene sulfonate _____ 18.0
Nekal BX _____ 1.5
Agent A _____ 1.0

Example

| | 3 | 4 | 5 | 6 | 7 | 8 |
|---|---|---|---|---|---|---|
| 4-amino-4'-methoxydiphenylamine (D+S) | 15.0 | 15.0 | 15.0 | 15.0 | 15.0 | 15.0 |
| Phloroglucinol | 3.0 | | | | | |
| 4-(5-chloro-2-hydroxybenzeneazo) resorcinol | | 8.0 | | | | |
| 3-hydroxydiphenylamine | | | 8.0 | | | |
| 3-hydroxy-2-naphtho-m-xylidide | | | | 19.0 | | |
| 4'-chloro-2-hydroxy-3-carbazole-carboxanilide | | | | | 25.0 | |
| 3,3'-dihydroxy-2-naphthanilide | | | | | | 8.0 |
| Borax | 3.5 | 3.5 | 3.5 | 3.5 | 3.5 | 3.5 |
| Caustic soda flake | 17.0 | 17.0 | 17.0 | 17.0 | 17.0 | 17.0 |
| Sodium xylene sulfonate | 21.0 | 21.0 | 21.0 | 21.0 | 21.0 | 21.0 |
| Nekal BX | 1.5 | 1.5 | 1.5 | 1.5 | 1.5 | 1.5 |
| Agent A | 1.0 | 1.0 | 1.0 | 1.0 | 1.0 | 1.0 |
| Print color | Black | Black | Red | Navy | Plum | Black |

Example 9

The following ingredients for a black print are dry-mixed.

| | Parts |
|---|---|
| 4-amino-4'-methoxydiphenylamine (D+S) | 15.0 |
| Naphthol AS | 14.0 |
| Naphthol AS–G | 4.0 |
| Borax | 3.5 |
| Caustic soda flake | 17.0 |
| Sodium xylene sulfonate | 21.0 |
| Nekal BX | 1.5 |
| Agent A | 1.0 |

Example

| | 10 | 11 | 12 | 13 | 14 | 15 | 16 |
|---|---|---|---|---|---|---|---|
| 4-aminodiphenylamine (D+S) | 15 | 15 | 15 | 15 | 15 | 15 | 15 |
| Naphthol AS | 19 | | | | | | |
| Phloroglucinol | | 3 | | | | | |
| 4-(5-chloro-2-hydroxybenzeneazo) resorcinol | | | 8 | | | | |
| 3-hydroxydiphenylamine | | | | 8 | | | |
| 3-hydroxy-2-naphtho–toluidide | | | | | 19 | | |
| 4c'-hloro-2-hydroxy-3-carbazole-carboxanilide | | | | | | 25 | |
| 3,3'-dihydroxynaphthanilide | | | | | | | 8 |
| Borax | 3.5 | 3.5 | 3.5 | 3.5 | 3.5 | 3.5 | 3.5 |
| Caustic soda flake | 17 | 17 | 17 | 17 | 17 | 17 | 17 |
| Sodium xylene sulfonate | 21 | 21 | 21 | 21 | 21 | 21 | 21 |
| Nekal BX | 1.5 | 1.5 | 1.5 | 1.5 | 1.5 | 1.5 | 1.5 |
| Agent A | 1.0 | 1.0 | 1.0 | 1.0 | 1.0 | 1.0 | 1.0 |

Prints made with the above compositions on cotton muslin as in Example 1 are a little more red in shade than those employing the diazo compound of Examples 1 and 3–8.

Example 17

The following ingredients for a greenish blue print are dry-mixed:

| | Parts |
|---|---|
| 4-amino-3-methoxydiphenylamine (D+S) | 15.0 |
| Naphthol AS–BS | 22.0 |
| Borax | 3.5 |
| Caustic soda flake | 17.0 |
| Sodium xylene sulfonate | 21.0 |
| Nekal BX | 1.5 |
| Agent A | 1.0 |

Example 18

The following ingredients for a yellowish green print are dry-mixed:

| | Parts |
|---|---|
| 4-amino-3-methoxydiphenylamine (D+S) | 15.0 |
| Naphthol AS–GR | 60.0 |
| Borax | 4.0 |
| Caustic soda flake | 22.0 |

Example 18—Continued

Sodium xylene sulfonate _____ 18.0
Nekal BX _____ 1.5
Agent A _____ 1.0

| Example | 19 | 20 | 21 | 22 |
|---|---|---|---|---|
| 4-amino-4'-methoxydiphenylamine (D+S) | 36.5 | 37.0 | 37.0 | 37.0 |
| Naphthol AS | 48.8 | | | |
| Naphthol AS–BS | | | 19.0 | |
| Naphthol AS–GR | | 157.0 | | 60.0 |
| Borax | 8.5 | 11.4 | 3.5 | 4.0 |
| Sodium xylene sulfonate | 53.0 | 45.5 | 21.0 | 18.0 |
| Agent A | 2.0 | 2.3 | 1.0 | 1.0 |
| Caustic soda flake | 42.4 | 56.8 | 17.0 | 22.0 |
| Nekal BX | 4.2 | 4.5 | 1.5 | 1.5 |

| Example | 23 | 24 |
|---|---|---|
| Diazo 23 (orange) | 71.5 | |
| Diazo 24 (blue) | | 86.5 |
| Naphthol AS–PH | 50.0 | |
| Naphthol AS | | 31.8 |
| Acetoacetanilide | | 16.0 |
| Resorcinol | | 8.5 |
| Borax | 15.0 | 5.8 |
| Sodium xylene sulfonate | 32.5 | 22.5 |
| Agent A | 2.5 | 1.3 |
| Caustic soda flake | 40.0 | |
| Nekal BX | | 2.5 |
| Sodium chromate | | 35.0 |
| Dextrin | | 22.5 |

| Example | 25 | 26 |
|---|---|---|
| Diazo 25 (red) | 12.0 | 12.0 |
| Naphthol AS | 11.0 | 7.0 |
| Naphthol AS–BS | | 4.0 |
| Borax | 3.0 | 3.0 |
| Sodium xylene sulfonate | 7.0 | 7.0 |
| Nekal BX | 0.5 | 0.5 |
| Caustic soda flake | 6.0 | 6.0 |
| Agent A | 0.5 | 0.5 |

This invention has been disclosed with respect to certain preferred embodiments and it will be understood that various modifications and variations therefore will become obvious to persons skilled in the art and are to be included within the spirit and purview of this invention and application and the scope of the appended claims.

I claim:

1. A dry particulate composition comprising an ice color diazo compound solubilized and stabilized against azoic coupling on the alkaline side by reaction with an organic amine containing at least one solubilizing group and at least one replaceable hydrogen atom attached to an amino nitrogen atom, an ice color coupling component, and based on the weight of said solubilized and stabilized diazo compound, about 3 to 30% of a member of the group consisting of alkali metal orthoborates and tetraborates, and about 30 to 180% of sodium xylene sulfonate, said composition yielding an alkaline solution in the presence of water.

2. A composition as defined in claim 1 wherein said diazo compound is derived from an aminodiphenylamine.

3. A composition as defined in claim 1 wherein said organic amine is sarcosine.

4. A composition as defined in claim 1 wherein said organic amine is N-methyl taurine.

5. A composition as defined in claim 1 wherein said coupling component is an aromatic hydroxy compound capable of coupling.

6. A composition as defined in claim 5 wherein said aromatic hydroxy compound is a β-hydroxy aromatic carboxylic acid arylide.

7. A composition as defined in claim 1 wherein said member is sodium tetraborate.

8. A composition as defined in claim 1 containing a cationic surface active agent.

9. A dry particulate composition comprising a diazotized aminodiphenylamine solubilized and stabilized against azoic coupling on the alkaline side by reaction with an organic amine selected from the group consisting of sarcosine and N-methyl taurine, an aromatic hydroxy compound capable of coupling, and based on the weight of said solubilized and stabilized diazotized compound, about 3 to 30% of sodium tetraborate and about 30 to 180% of sodium xylene sulfonate.

10. A composition as defined in claim 9 wherein said aromatic hydroxy compound capable of coupling is a β-hydroxy aromatic carboxylic acid arylide.

11. A composition as defined in claim 9 containing a cationic surface active agent.

No references cited.

NORMAN G. TORCHIN, *Primary Examiner.*

T. J. HERBERT, *Assistant Examiner.*

UNITED STATES PATENT OFFICE
CERTIFICATE OF CORRECTION

Patent No. 3,288,552                           November 29, 1966

Clemens Strek

It is certified that error appears in the above identified patent and that said Letters Patent are hereby corrected as shown below:

Column 5, line 8, "2,087,121" should read -- 2,087,131 --; line 34, "oleyl-dietetraethyleneoxy-" should read -- oleyl-ditetraethyleneoxy- --. Columns 7 and 8, third table, first column, line 8 thereof, "4c′-hloro-" should read -- 4′-chloro- --.

Signed and sealed this 10th day of March 1970.

(SEAL)
Attest:

Edward M. Fletcher, Jr.                            WILLIAM E. SCHUYLER, JR.
Attesting Officer                                     Commissioner of Patents